Dec. 25, 1951 V. E. CARBONARA 2,579,903
PERISCOPIC SEXTANT
Filed June 16, 1948 6 Sheets-Sheet 1

INVENTOR.
Victor E. Carbonara.
BY
ATTORNEY

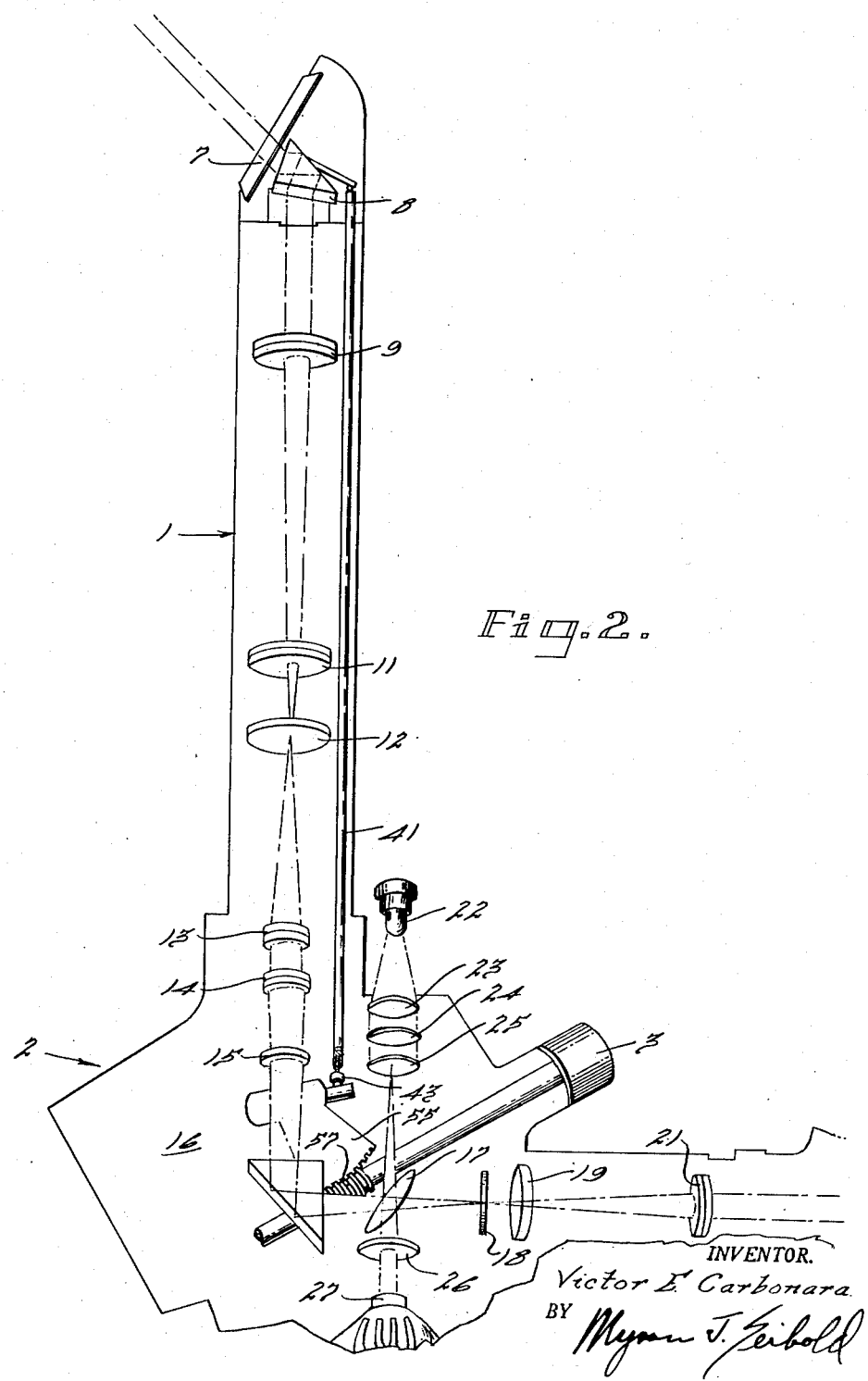

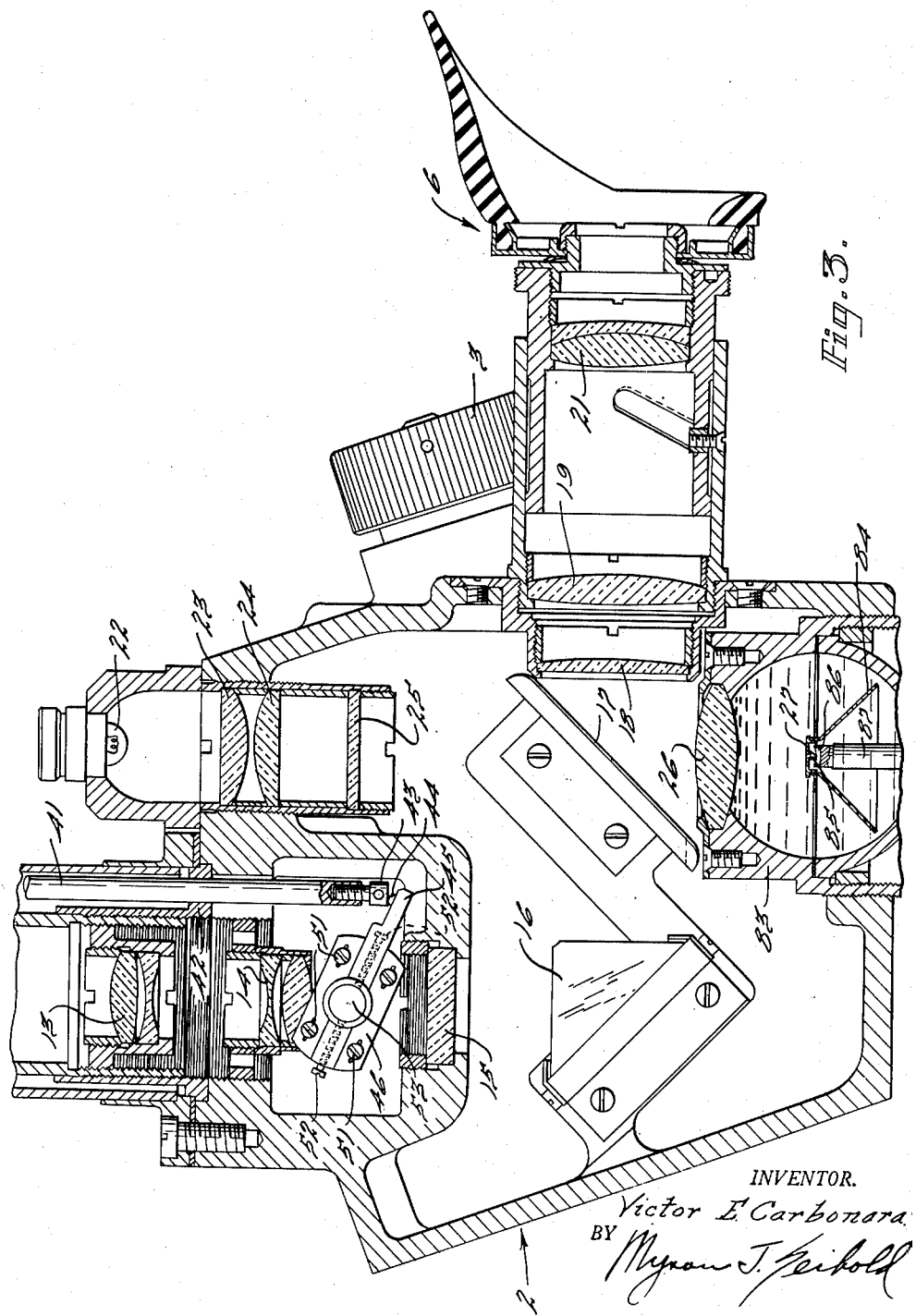

Dec. 25, 1951 V. E. CARBONARA 2,579,903
PERISCOPIC SEXTANT
Filed June 16, 1948 6 Sheets-Sheet 4

INVENTOR.
Victor E. Carbonara.
BY
ATTORNEY

Dec. 25, 1951   V. E. CARBONARA   2,579,903
PERISCOPIC SEXTANT
Filed June 16, 1948   6 Sheets-Sheet 5

INVENTOR.
Victor E. Carbonara
BY Myron J. Seibold
ATTORNEY

Dec. 25, 1951 — V. E. CARBONARA — 2,579,903
PERISCOPIC SEXTANT
Filed June 16, 1948 — 6 Sheets-Sheet 6

INVENTOR.
Victor E. Carbonara.
BY Myron J. Seibold
ATTORNEY.

Patented Dec. 25, 1951

2,579,903

UNITED STATES PATENT OFFICE 2,579,903

PERISCOPIC SEXTANT

Victor E. Carbonara, Manhasset, N. Y., assignor, by mesne assignments, to Kollsman Instrument Corporation, Elmhurst, N. Y., a corporation of New York Application June 16, 1948, Serial No. 33,345

2 Claims. (Cl. 88—2.7)

This invention relates to a periscopic sextant adapted to be projected through the skin of an aircraft to permit a navigator to make observations from within the cabin.

An object of the invention is to provide a periscopic sextant with a simple and accurate mechanical connection between the operating knob and the index prism.

Another object of the invention is the provision of a periscopic sextant in accordance with the preceding object in which there is provided adjusting means to properly correlate the rotation of the prism and the instrument counter indication.

Another object of the invention is the provision of a periscopic sextant in accordance with the preceding object in which the adjusting means will not only take care of cumulative mechanical error in the gear portion of the mechanical operating train, but will also serve to reduce any error which may be present in the prism surfaces.

Another object of the invention is the provision of a periscopic sextant with a mechanical operating train between the index prism and the operating knob which does not require the presence of gearing at the index prism so that a minimum sized head may be used with a corresponding small opening through which it may be passed.

Other objects and features of the invention will be readily apparent to those skilled in the art from the specification and appended drawings illustrating certain preferred embodiments in which:

Figure 2 is a diagrammatic representation of the optical system through the instrument showing both the main optical system through the instrument and the optically produced artificial horizon.

Figure 3 is a sectional view through the main body portion of the instrument.

Figure 1:
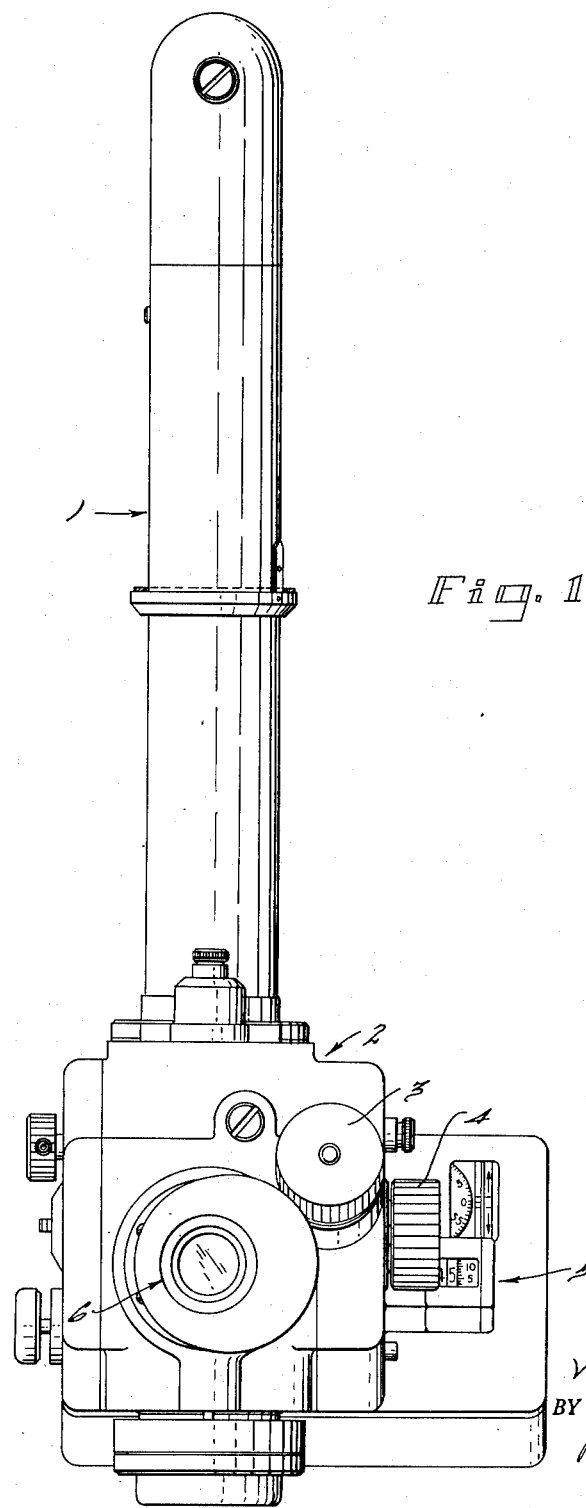
Figure 1 is a front elevational view of a periscopic sextant in accordance with the present invention.

In the elevational view of Figure 1, the sextant is shown as comprising a main body portion 2 and a tubular periscope section 1. The main body portion includes the operating knob 3 and a second high speed operating knob 4 for rotating the index prism and the counter 5. The eyepiece for the observer is indicated at 6.

The optical system illustrated in Figure 2 comprises an entrance window 7 through which the light from the observed body passes to the index prism 8 and thence through first and second objective lenses 9 and 11 and objective field lens 12. From the objective field lens 12, the light passes through an erecting system formed by the lenses 13, 14, through a window 15 and thence to a prism 16 from whence the light is reflected and passes through a partially reflecting pellicle 17 to form a real image of the observed body in the focal plane of the erecting system at which is disposed the eyepiece field lens 18. The eyepiece through which the image is observed further includes an intermediate field lens 19 and an eye lens 21.

The artificial horizon is obtained by the light of an illuminated line reflected from a pendulous mirror. The light source is indicated at 22, passing through condenser lenses 23 and 24 and then through a filter and reticle 25 which has a thin line thereon through which light from the source 22 passes. Light from the illuminated line passes through the pellicle 17 and a lens 26 to the reflecting surface of a pendulous mirror 27 from which the light is reflected again through the lens 26 to the pellicle 17 from which it is reflected into the optical path from the observed body. The lens 26 has its focus coincident with that of the optical system of the sextant so that it forms a real image on the illuminated line at the field lens 18. With the magnifying ocular focused upon the real images of the observed body and illuminated line, it views them projected to infinity. The altitude angle of a celestial body is obtained when the instrument is adjusted so that the images of the body and the illuminated line coincide, as will be explained.

Figure 5:
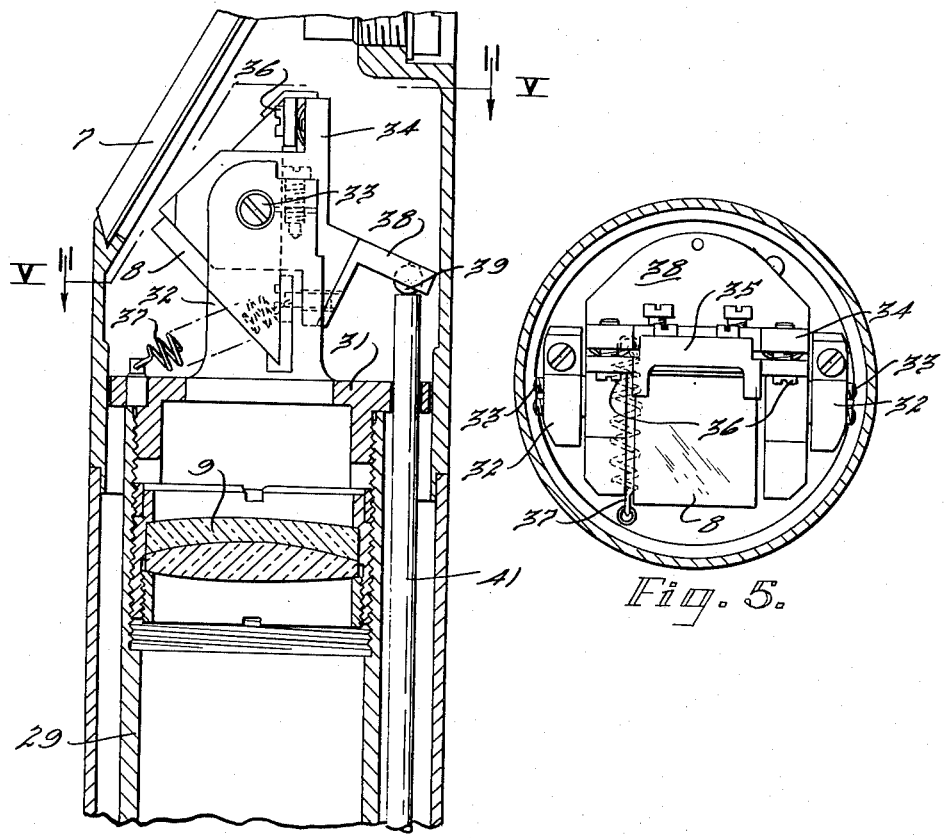
Figure 5 is a detailed view of the body of the index prism in the periscope head on line V—V of Figure 4.
Figure 4:
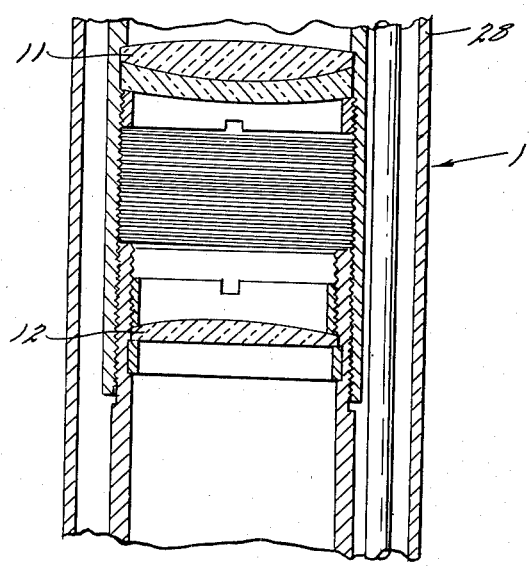
Figure 4 is a sectional view through the periscope portion of the instrument.

Referring to Figures 4 and 5, it will be seen that the periscope section of the instrument is comprised of an outer tube 28 within which is disposed a second tube 29 carrying the optics of the periscope portion of the sextant. At the head of the periscope there is provided the entrance window 7 and index prism 8 previously described. At the upper end of the tubular portion 29 is mounted a platform 31 upon which are supported a pair of posts 32 to which is pivotally mounted, by the bearing studs 33, a frame 34 to which is adjustably connected the mount 35 carrying the prism 8, as by means of resiliently opposed studs 36. The frame 34 is biased in a clockwise direction as viewed in Figure 4 by a tension spring 37 and has an integral arm 38 carrying a ball 39 engaging the square end surface of a vertical operating rod 41 guided for reciprocable movement in openings in the head 31 and in a lower flange 42 (Figure 3) rigidly connected to the lower portion of the tube 29.

Figure 7:
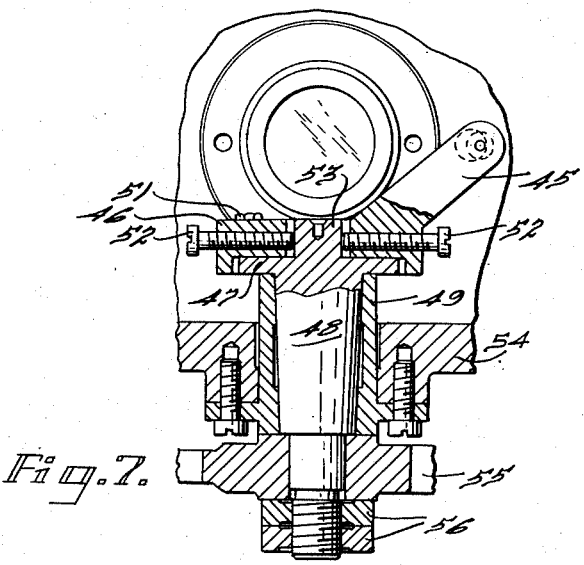
Figure 7 is a sectional view on the line VII—VII of Figure 6.

Referring to Figure 3, into the lower end of the rod 41 there is adjustably threaded a head 43 having a square bottom surface engaging a ball 44 carried by an arm 45 rigid with a plate 46 mounted upon a plate like hub 47 integral with a rotatable shaft 48 which is of conical form and mounted in a conical bearing 49 (Figure 7). The plate 46 is adjustably mounted on the hub 47 through a plurality of locking studs 51 threaded in the hub 47 and with the openings through the plate 46 slotted so as to permit variation of the effective length of the arm 45. A pair of adjusting studs 52 are threaded into the plate 46 and bear upon a reduced extension 53 of the hub 48.

As shown in Figure 7, the shaft 48 passes through a dividing wall 54 of the main body portion 2 and carries at the end opposite the hub 47 a sector 55 rigidly mounted on the shaft 48 by the nuts 56.

Figure 6:
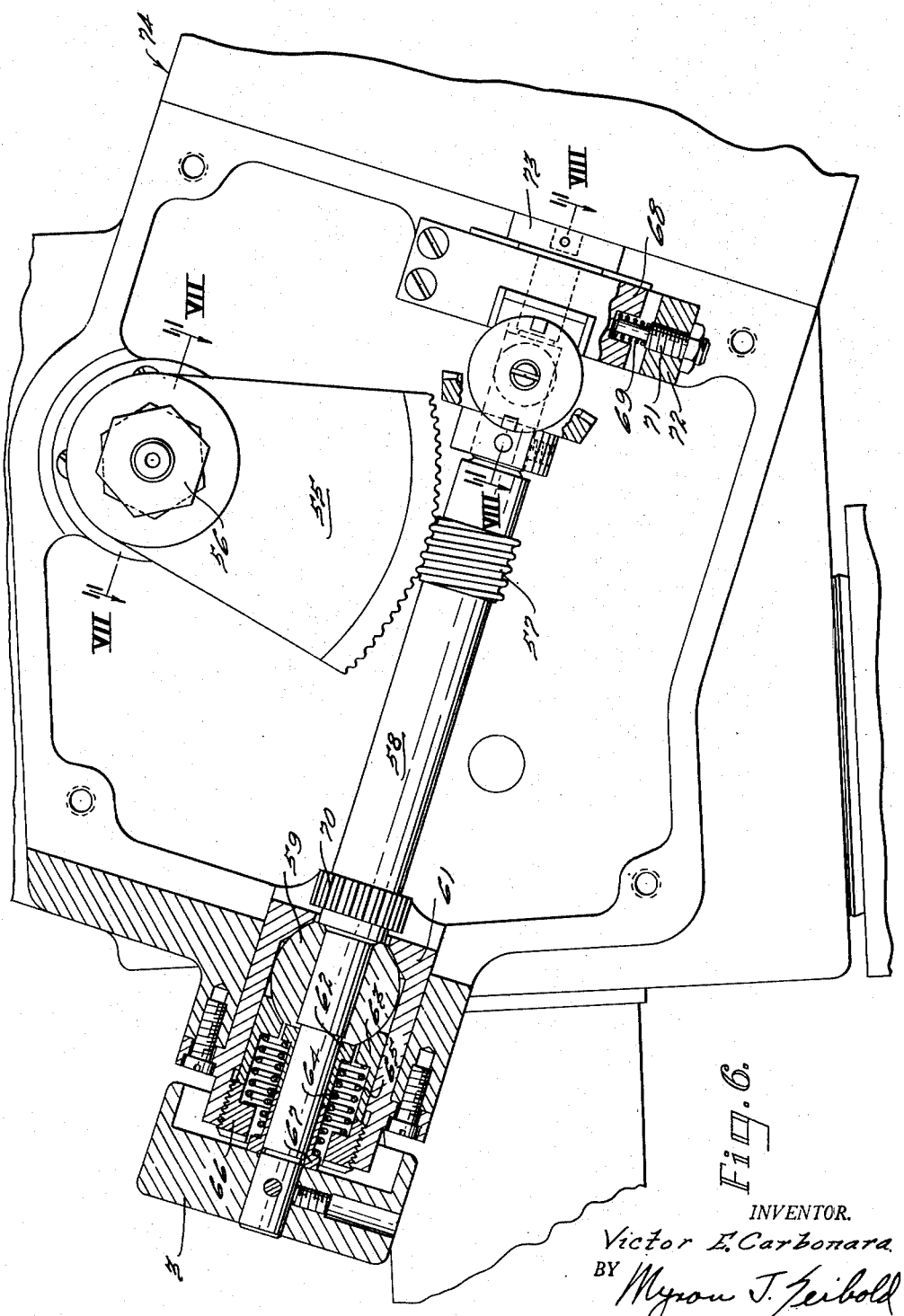
Figure 6 is a sectional view showing a part of the operating mechanism.

Referring to Figure 6, the sector 55 meshes with a worm gear 57 mounted upon a shaft 58 extending to the exterior of the body portion of the sextant and carrying the operating knob 3.

Provision is made for a limited rotative movement of the shaft 58 about a transverse axis through the ball portion 59 setting on one side in the socket 61 and spring biased therein by engagement at the opposite side with seats 62, 63 biased against the ball portion 59 by the springs 64 and 65 disposed against the stops 66, 67. The inner end of the shaft 58 is journalled in a floating bearing 68 biased upwardly, in a direction to maintain the worm and sector engaged, by means of a spring 69 surrounding a limiting stud 71 threaded into a fixed part 72.

Figure 8:
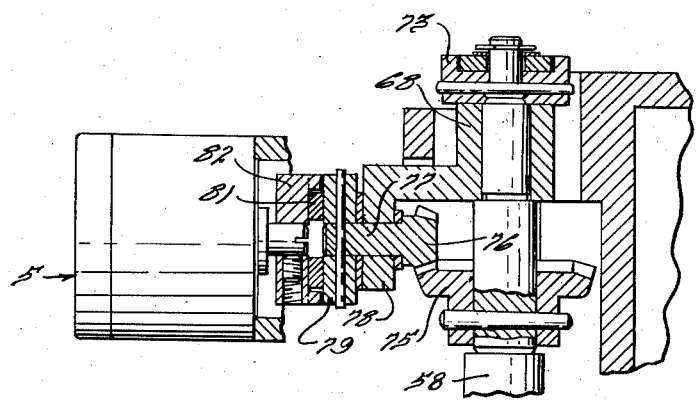
Figure 8 is a sectional view on the line VIII—VIII of Figure 6.

As shown in Figures 6 and 8, the shaft 56 terminates in a coupling 73 engaging the operating mechanism of an averager indicated generally at 74. This averager may or may not be used with the sextant construction and as it forms no part of the present invention it has not been illustrated herein. Its function, as is well known in the art, is to provide for an instrument reading which is an average taken over a continuous period of time. Without the averager, the instrument is fully operative in the same manner as other sextants with the observer taking either a single observation or a plurality of observations in quick succession from which an average is taken.

As shown in Figures 6 and 8, there is pinned to the shaft 56 a bevel gear 75 meshing with a bevel gear 76 at one end of a shaft 77 pivoted in an arm 78 mounted on the bearing 68. To the end of the shaft 77 is pinned a coupling 79 meshing through a star plate 81 with a coupling 82 on the counter 5. As this counter is a standard commercial item, it is shown only in elevation in the drawings.

Referring to Figure 3, it is seen that the reflecting mirror 27 is disposed within a container 83 having a spherical inner chamber filled with a damping liquid in which the mirror 27 and its depending skirt 84 are disposed, the mirror having a pivot 85 seating in a cup seat 86 carried by a post 87. This pendulous mirror is disclosed and claimed in applicant's co-pending application Serial No. 31,928, filed June 9, 1948, for Horizontal Reference, now Patent No. 2,557,340, issued June 19, 1951.

The shaft 58 is provided with a gear 70 meshing with a gear (not shown) on the high speed knob 4 for quick movement of the index prism.

It is seen that the operating mechanism for the index prism 8 does away entirely with the necessity for gearing in the periscopic head and permits not only the use of a slender periscope tube 1, but also minimum size head so that the instrument is not only smaller but requires but a small opening through the aircraft skin. With the adjustment of the effective length of the rod 41 by rotation of the head 43, and of the length of the arm 45 by adjustment of the plate 46 on the hub 47, the angular position of the prism 8 and the reading on the counter 5 may be brought into proper relationship within allowable limits over the field of operation of the prism. The distance between the axis of the shaft 48 and the center of the ball 44 will be substantially the same as the distance between the axis of rotation of the prism 8 and the center of the ball 39.

The adjustment is ordinarily made by optical collimation to give the correct readings on the counter for the angular positions of the index prism. Ordinarily the effective length of the rod 41 is first adjusted by the head 43 to secure opposite sign variations on the counter for zero and 90° positions of the prism when the counter and prism are in conformance for 45°. Thereafter the length of the arm 45 is adjusted by loosening the screws 51 and rotating the screws 52 in opposite directions until the prism and counter are in conformance at zero and 90° as well as at 45°.

The foregoing adjustment of the length of the rod 41 and of the arm 45 also takes care of cumulative error which might occur between the sector 55 and the worm gear 57. Hence, this gearing does not have to be as exact as in the case where a cumulative error would be added into the instrument reading.

The adjustment above referred to can further reduce any error which might arise due to the fact that the planes of the prism are not at the exact 45° angle.

The ball mount 59 and the spring biased bearing 68 shown in Figure 6 maintain the worm and sector in engagement and take care of variations in the relative height of the gears. The limiting stud 71 is normally set to take care of the highest gear condition and thereafter the spring 69 will move the bearing 68 to maintain the worm and sector in engagement for lower gear positions.

While a particular preferred embodiment of the invention has been illustrated in the drawings, it is understood that the invention is not limited thereto, as many variations will be readily apparent to those skilled in the art and the invention is to be given its broadest possible interpretation within the terms of the following claims.

What is claimed is:

1. In a periscopic sextant, a main body portion carrying an eye piece for viewing the image of an observed object, an elongated periscopic portion projecting from said main body portion, an index prism at the end of said periscopic portion, an optical system in said periscopic and main body portions for producing an image of an object observed through said index prism, a horizontal reference with respect to which the image of said object is observed, means for indicating the angular position of said index prism, and manually operated means interconnecting said index prism and said angle indicating means for effecting rotation of said index prism and for indicating its angular position and the angular height of said observed object, said manually operated means including a manually rotatable first arm pivoted in said main body portion, a second arm pivotally mounted near the outermost end of said periscopic portion, said index prism connected to said second arm, a spring means biasing said index prism in one direction, both of said arms having spherical surfaces on oppositely directed sides thereof mounted so as to be directed toward each other, adjustment means provided on the pivotal mounting of said first arm so that the effective lengths of said arms can be brought into substantial conformance, a reciprocable rod interconnecting said arms, said rod having right angle flat end surfaces engaging said spherical surfaces on said arms so as to engage said spherical surfaces tangentially at all times, whereby rotation of said first arm not only effects rotation of said second arm and index prism through reciprocation of said rod but also positions said angle indicating means.

2. In a periscopic sextant, a main body portion carrying an eye piece for viewing the image of an observed object, an elongated periscopic portion projecting from said main body portion, an index prism at the end of said periscopic portion, an optical system in said periscopic and main body portions for producing an image of an object observed through said index prism, a horizontal reference with respect to which the image of said object is observed, means for indicating the angular position of said index prism, and manually operated means interconnecting said index prism and said angle indicating means for effecting rotation of said index prism and for indicating its angular position and the angular height of said observed object, said manually operated means including a manually rotatable first arm pivoted in said main body portion, said pivoted arm having a pair of positioning screws for adjusting the effective length of the arm, a second arm pivotally mounted near the outermost end of said periscopic portion, said index prism being connected to said second arm, spring means biasing said index prism in one direction, both of said arms having spherical surfaces on oppositely directed sides thereof mounted so as to be directed toward each other, said positioning screws enabling the effective lengths of the arms to be brought into substantial conformance, a reciprocable rod interconnecting said arms, said rod having right angle flat end surfaces engaging said spherical surfaces on said arms so as to engage said spherical surfaces tangentially at all times, whereby rotation of said first arm not only effects rotation of said second arm and index prism through reciprocation of said rod but also positions said angle indicating means.

VICTOR E. CARBONARA.

REFERENCES CITED

The following references are of record in the file of this patent:

UNITED STATES PATENTS

| Number | Name | Date |
|---|---|---|
| 725,570 | Lake | Apr. 14, 1903 |
| 826,155 | Dudley | July 17, 1906 |
| 988,279 | Moller | Mar. 28, 1911 |
| 1,178,474 | Becker | Apr. 4, 1916 |
| 2,229,855 | Liebmann | Jan. 28, 1941 |
| 2,280,798 | Crane et al. | Apr. 28, 1942 |
| 2,305,437 | Meyers et al. | Dec. 15, 1942 |
| 2,378,282 | Brueske | June 12, 1945 |
| 2,413,017 | Willcox | Dec. 24, 1946 |
| 2,484,072 | Castedello | Oct. 11, 1949 |

FOREIGN PATENTS

| Number | Country | Date |
|---|---|---|
| 544,217 | Great Britain | Apr. 2, 1942 |